Figures 1, 2:
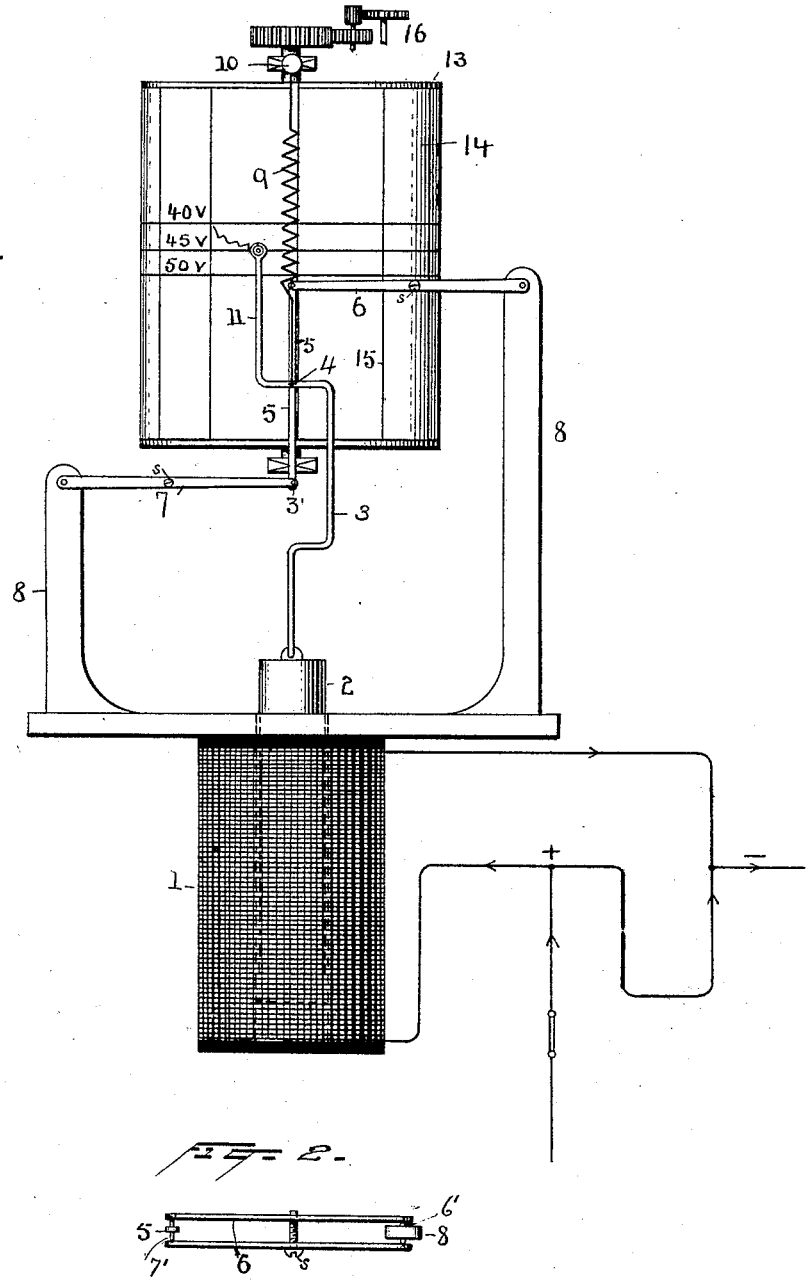

(No Model.)

F. D'A. GOOLD.
RECORDING VOLTMETER.

No. 525,894. Patented Sept. 11, 1894.

Witnesses
Norris A. Clark.
N. F. Oberly

Inventor
F. D'A Goold,
By his Attorneys
Dyer & Seely

UNITED STATES PATENT OFFICE.

FREDERICK D'A. GOOLD, OF SCHENECTADY, ASSIGNOR TO THE EDISON GENERAL ELECTRIC COMPANY, OF NEW YORK, N. Y.

RECORDING-VOLTMETER.

SPECIFICATION forming part of Letters Patent No. 525,894, dated September 11, 1894.

Application filed April 16, 1892. Serial No. 429,427. (No model.)

*To all whom it may concern:*

Be it known that I, FREDERICK D'A. GOOLD, a citizen of the United States, residing at Schenectady, county of Schenectady, State of New York, have invented a certain new and useful Improvement in Recorders, of which the following is a specification.

The present invention relates to recorders and more especially to recording volt meters, the main object being to provide a simple and effective instrument adapted to record variations in the voltage of a circuit, and the invention consists in recorders constructed in accordance with the principle hereinafter described and claimed.

Figure 1 of the drawings is a general view illustrating the construction of the recorder and its connection with a circuit, and Fig. 2 illustrates a detail to be described.

The recorder comprises an operating coil or solenoid 1, preferably of high resistance wire, into the center of which projects a soft iron core 2. At the upper end of the core is secured an arm 3 connected at the point 4 with the center of an arm 5. At the two extremities of said arm 5 are connected the two pivoted levers 6, 7 of equal length, and which have bearings at the upper ends of standards 8. All the bearings are preferably hard steel pointed bearings as indicated at 6', 7', Fig. 2. The levers 6, 7 are preferably each composed of two light pieces of aluminium held against opposite ends of the pivot pins by a central screw *s*. At the point 4 is connected a spring 9, the opposite end of which is secured to a screw 10 by means of which the tension of the spring may be adjusted. The spring is regulated when the instrument is adjusted for use and is of sufficient strength to support the weight of the armature. It will be evident that the levers 6, 7 and the cross-arm 5 constitute a parallel motion, and that the central point 4 will move in a straight line when the levers are moved by the armature 2, the arm 5 tilting toward the right or left according to the direction of movement of the armature. Arm 3 being bent as shown is out of the path of movement of the levers. At the point 4, or on an arm 11 extending from said point, I mount a pencil or marking point 12. The system of levers described enables me to place the drum and working mechanism at a considerable distance from the coil and armature and still to obtain an accurate record of the movement of the armature, and the friction of the pencil on the paper will not cause the armature to bind in its coil by throwing it out of an exact axial line.

13 is a drum, on the surface of which is a sheet of paper 14 suitably marked by transverse lines 40 V., 45 V., 50 V., &c., the markings corresponding with the voltage of the circuit in connection with which the instrument is to be used. The sheet is also preferably provided with longitudinal lines 15, the spaces between these lines indicating the distance through which the drum is turned during a predetermined time, say five minutes, by the clock-work motor indicated by the wheels 16. Instead of the drum other suitable means for advancing the paper may be used. As the parts stand in the drawings, the circuit is supposed to be closed and the voltage in the circuit to be forty-five volts. When the recorder is used for short intervals only at any one time, as in testing a circuit, the drum is preferably caused to rotate at the rate of once an hour, but if it is desired to use it for longer intervals, the drum may be caused to rotate more slowly. By using coarse wire in the coil 1, and changing the arrangement of lines or marks on the paper sheet, the instrument can be used as an ammeter.

What I claim is—

1. In a recorder, the combination with a movable recording surface, of a recorder, a series of levers comprising a parallel motion, to which said recorder is secured at a point which moves in a straight line, and an operating coil and armature, said armature being suspended from said levers at a point which moves in a straight line, substantially as set forth.

2. In a recorder, the combination with a movable recording surface, of a recorder, a series of levers comprising a parallel motion to which said recorder is secured at a point which moves in a straight line, an operating coil, an armature moved thereby, said armature being suspended from said levers at a point which moves in a straight line, and an adjustable spring also connected to said levers at a point which moves in a straight line, substantially as set forth.

3. In a recorder, the combination with a movable recording surface, of a recorder, a series of levers comprising a parallel motion, to which said recorder is secured at the point which moves in a straight line, an operating coil, an armature moved thereby, said armature being suspended from said levers at the point where the recorder is secured, and an adjustable spring also connected to said levers at the point where the recorder is secured, substantially as set forth.

4. The combination, in a recorder, of a coil and armature, three levers 5, 6, 7, a connection between the center of the first lever and the armature, a marking point connected to said central point, and a regularly movable surface on which said point is adapted to bear, substantially as described.

This specification signed and witnessed this 12th day of April, 1892.

FREDK. D'A. GOOLD.

Witnesses:
CHARLES M. CATLIN,
GEORGE B. BUCHANAN.